United States Patent Office 2,883,424
Patented Apr. 21, 1959

2,883,424

DIHYDROXY STEROID DERIVATIVES AND METHOD OF PREPARING SAME

Bernard S. Wildi, Dayton, Ohio, assignor to Monsanto Chemical Company, St. Louis, Mo., a corporation of Delaware No Drawing. Application June 20, 1956
Serial No. 592,510

14 Claims. (Cl. 260—586)

The present invention is directed to 3,5-seco-3,5-dihydroxy steroids and to methods of making these compounds.

In recent years there has been great interest in modifying the ring structure of various steroids in an effort to obtain better therapeutic compounds; such modifications often include the expansion or contraction of a steriod ring, or the introduction of a hetero atom into a steroid ring. It is an object of the present invention to provide a group of organic intermediates which are useful in the preparation of some of the known types of ring-modified steroid derivatives, and which are also useful in the preparation of new types of steroids. It is a further object of the present invention to provide an efficient method of preparing 3,5-seco-3,5-dihydroxy steroids, thereby providing a new route toward the preparation of ring-modified steroid derivatives.

The new compounds of the present invention are steroid-3,5-seco-4-nor-3,5-diols. Such compounds can be represented by the structure:

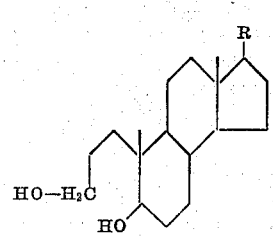

the numbering of the carbon atoms being according to conventional steroid usage; R is a steroid side chain group. The indicated structure can have double bonds located at various positions, and can also have various substituents, e.g., hydroxyl groups, acyloxy groups, keto groups, halogen substituents, such as fluorine, bromine, chlorine, etc. Moreover, the various nor- and homo-steroids are contemplated, i.e., either one, or both of the indicated methyl substituents can be absent, or the rings can be modified as in, e.g., the D-nor and D-homo steroids. R in the above structural representation can be any of the common steroid side chains, e.g., $CH_3CO-$, $-CH(CH_3)(CH_2)_3CH(CH_3)_2$ $-CH(CH_3)CH_2CH_2CH(C_2H_5)CH(CH_3)_2$ $-CH(CH_3)CH=CHCH(C_2H_5)CH(CH_3)_2$ $-CH(CH_3)CH=CHCH(CH_3)CH(CH_3)_2$ $HOCH_2CO-$, $CH_3CH(OH)-$ etc. or simply hydrogen or other substituents, e.g., hydroxyl. The above structure can be designated as a 10,13-dimethylpolyhydrocyclopentanophenanthrene structure with a cleaved ring.

As the designation "3,5-seco-" indicates that the 3- and 5-positions are terminal positions in a cleaved A-ring, it appears unnecessary to further indicate the absence of the 4-carbon atom by such designations as "A-nor," or "4-nor" in these compounds; moreover, in every case in the present specification in which there is fission in the A-ring, the 4-carbon atom is absent. Accordingly, the designation "3,5-seco" in the present specification and claims should be taken as indicating the absence of the 4-carbon atom.

The reactions involved in my new process for preparing 3,5-seco-3,5-dihydroxy steroids can be illustrated by the following equations:

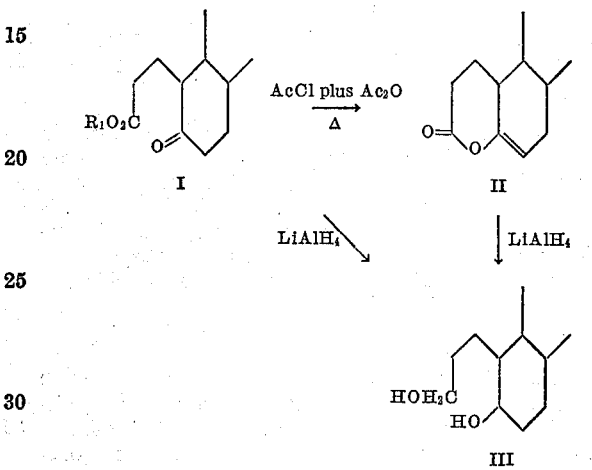

in which $R_1$ represents hydrogen or a monovalent organic radical, and Ac represents an acyl radical, e.g.,

The procedure involves the reduction of a 3,5-seco-steroid-5-keto-3-oic acid or ester (I); ordinarily the 3,5-seco-5-keto-3-oic steroid is dehydrated to its enol lactone, i.e., to a 3-keto-4-oxa-$\Delta^5$-steroid (II), prior to the reduction; of course, the steroid enol lactone (II) can be reduced to the 3,5-seco-3,5-dihydroxy steroid compound (III), regardless of the source of the enol lactone.

The steroid 3,5-diol derivatives of the present invention can readily be converted to steroids containing a 5-membered A-ring, by replacing the hydroxyl groups with chlorine or bromine, and then closing the ring by heating in the presence of zinc dust or other dehalogenating agent. The chlorination procedure is carried out by simply heating the 3,5-seco-3,5-diol steroid compound with a slight excess over the stoichiometrically required amount of thionyl chloride. Other chlorinating agents are also effective. Any other free hydroxyl groups in the steroid will also be replaced by chlorine; if this is not considered desirable, such hydroxyl groups can be protected by etherification or other known protective means, prior to the chlorination, or at some earlier stage in the preparative procedure.

The use of zinc or alkali or alkaline earth metals to cause ring closure in the 3,5-seco-3,5-dihalo steroids is a Wurtz or Wurtz-Fittig type reaction. The reaction can be conducted by adding the steroid derivative to a suspension of zinc dust in ethyl alcohol, and warming the mixture. Other solvents can be used in this procedure, e.g., acetamide. This procedure will also remove any vic-dihalogens in the steroid nucleus to leave double bonds in the nucleus.

The usefulness of 3,5-seco-3,5-dihydroxy steroid compounds as organic intermediates is illustrated by the following equations:

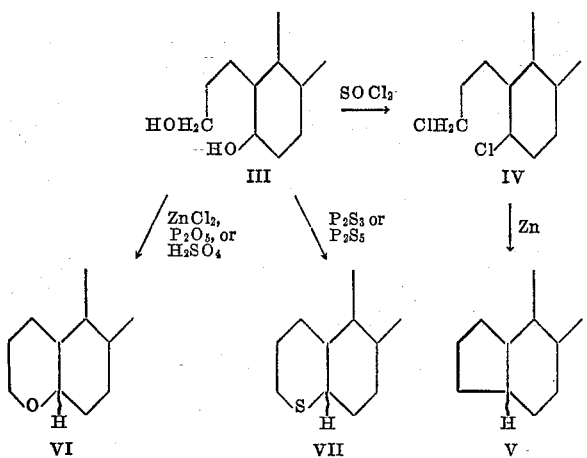

The A-nor steroids (V) are a known class of useful steroid compounds, while the 4-oxa steroids (VI) and 4-thio steroids (VII) are believed to be novel classes of steroids; therapeutic steroid compounds in which the A-ring is replaced by a tetrahydropyran ring, or by a tetrahydrothiopyran ring, have not been disclosed heretofore.

The following examples illustrate certain specific embodiments of my invention.

*Example 1*

The enol lactone of $\Delta^4$-cholesten-3-one, 5 grams, in 200 ml. of ethyl ether was added to 1 gram of $LiAlH_4$ dissolved in 400 ml. of ethyl ether. The reaction mixture was stirred 3 hours at room temperature and then one-half hour at reflux. Ethyl acetate was added to decompose excess $LiAlH_4$, and then water was added. The reaction mixture was washed with 1% $H_2SO_4$, followed by two 100-ml. portions of sodium carbonate, and two 100-ml. portions of water. The reaction mixture was dried over sodium sulfate, and the solvent was removed by evaporation to leave an oil as the product. Part of the oil was crystallized and recrystallized from ethyl ether-petroleum ether solvent, and had a melting point of 212 to 214° C. The 3,5-seco-cholestan-3,5-diol gave the following analysis:

Calc'd for $C_{26}H_{48}O_2$: C, 79.54; H, 12.32. Found: C, 79.83; H, 11.77.

Infrared analysis confirmed the structure, as it showed no carbonyl absorption, and indicated the presence of the hydroxyl group.

A molar excess of thionyl chloride is slowly added to 5 grams of 3,5-seco-cholestan-3,5-diol prepared as above. The mixture is warmed on a water bath for several hours, and excess thionyl chloride is removed by evaporation. The residue is dissolved in about 50 cc. of ethyl alcohol, and 20 grams of zinc dust is added, and the mixture is heated for 15 to 20 minutes on a steam bath. The mixture is filtered through a glass filter, and the A-nor-cholestane is precipitated from the filtrate by addition of water. The product can be purified by taking it up with ether, evaporating the ether, and recrystallizing from ethyl ether-petroleum ether. A-norcholestane is a known steroid compound (Elsevier's Encyclopaedia of Organic Chemistry, vol. 14, supplement, page 1372S).

The enol lactone of cholestenone used in the above example can be prepared by the following procedure: 3,5-secocholestan-3-one-5-oic acid, 2 grams, is refluxed in 25 ml. of acetic anhydride and 10 ml. of acetyl chloride for 64 hours. The solvent is evaporated by heating to 100° C. under water pump vacuum, and the residue is taken up in ether, washed with water and bicarbonate, and dried over $Na_2SO_4$. The ether solution is evaporated to dryness, and the residue is recrystallized from acetone-water to yield 0.246 gram of the enol lactone of cholestenone, M.P. 83–86° C. Another recrystallization raises the melting point to 86–88° C.

*Example 2*

The enol lactone of progesterone (4-oxa-$\Delta^5$-pregnen-3,20-dione) is converted to a 20-ethylene glycol ketal derivative by heating 5 grams of the compound in 400 ml. of benzene with 25 ml. of ethylene glycol and 0.3 gram of para-toluenesulfonic acid to reflux for 5 hours. The cooled solution is then washed with sodium bicarbonate solution and dried over sodium sulfate and the benzene and excess ethylene glycol are removed by distillation under vacuum. The residue is taken up in 100 ml. benzene, and added to 1 gram of $LiAlH_4$ in 400 ml. of ethyl ether. The mixture is stirred for 3 hours at room temperature and refluxed for one-half hour. Excess $LiAlH_4$ is decomposed with ethyl acetate, and water is added. Dilute hydrochloric acid, 100 ml., is then added to hydrolyze the 20-ketal group. The ether layer is separated and dried, and the ether is distilled to leave 3,5-seco-pregnane-3,5-diol-2-one as the product. The 3,5-seco-pregnane-3,5-diol-20-one is converted to A-norpregnane-20-one, which is of interest for its progestational properties, by following the procedure of Example 1. 3,5-seco-pregnane-3,5-diol-20-one can also be converted to 4-oxa-pregnane-20-one, and 4-thio-pregnane-20-one which are of interest as anti-inflammatory agents.

By following the above procedure with the corresponding 11-hydroxy pregnane, a 3,5-seco-pregnane-3,5,11-triol-20-one can be produced. This compound can be dehydrated to 4-oxa-pregnane-11-ol-20-one by heating in the presence of sulfuric acid; the latter compound will be useful as an antirheumatic agent. 4-Oxapregnane-11,17$\alpha$, 21-triol-20-one which can be prepared by a similar procedure is also of interest as an antirheumatic agent.

*Example 3*

By following the procedure of Example 2, 4-oxa-$\Delta^5$-androsten-3,17-dione is converted to 3,5-seco-androstan-3,5-diol-17-one. Upon heating the latter compound with zinc chloride, 4-oxa-androstane-17-one is obtained. The 4-oxa-androstane-17-one has androgenic activity.

*Example 4*

The keto acid of $\Delta^4$-cholesten-3-one (3,5-seco-cholestan-5-one-3-oic acid), 4,5 grams, in 200 ml. of ethyl ether is added to 1 gram of $LiAlH_4$ in 400 ml. of ethyl ether. The mixture is stirred for 3 hours at room temperature and refluxed for one-half hour. Upon working up the product as in Example 1, 3,5-seco-cholestan-3,5-diol is obtained. By the same procedure any of the 3-oic acid ester derivatives of the above keto acid can be reduced to the 3,5-diol compound. Lower hydrocarbon esters are preferred, e.g., the ethyl, methyl, or any alkyl or aromatic esters in which the alcoholic residue contains 1 to 8 carbon atoms.

*Example 5*

3-keto-4-oxa-$\Delta^5$-androstene, 3 grams, is dissolved in 100 ml. of absolute ethyl alcohol. About 10 grams of sodium is placed in 200 cc. of dry toluene, and the mixture is heated until the sodium is melted, and cooled to about 60° C., at which time the alcoholic solution of steroid is added. An additional 100 ml. of absolute ethyl alcohol is added and the mixture is then heated on a steam bath until all of the sodium has dissolved. The mixture is washed with water, and acidified with dilute hydrochloric acid. The toluene and ethyl alcohol are removed by steam distillation, and the residue is extracted with ether, and the ether extract is dried over magnesium sulfate. The ether is evaporated to leave 3,5-seco-androstane-3,5-diol. This product upon chlorination with thionly chloride, and cyclization by warming with zinc dust, is converted to A-norandrostane, or its isomer, A-nor-etiocholane, which are known compounds, classified as sex hormones (Rodd, Chemistry of Carbon Compounds, IIB 925, Elsevier Pub. Co., 1953).

In place of the ethyl alcohol above, other alcohols, e.g., butyl, isobutyl, etc. and any other alcohols which are effective in Bouveault-Blanc reductions can be used in the above procedure, or to reduce enol lactones of other steroids.

Example 6

The procedure of Example 1 is followed, except that lithium borohydride is substituted for lithium aluminum hydride. The reaction mixture is worked up as in Example 1 to give 3,5-seco-cholestan-3,5-diol.

Example 7

3-keto-4-oxa-Δ⁵-chloestene, 5 grams, in 200 ml. of dioxane is placed in a rocking-type autoclave with 0.5 gram of copper chromite catalyst. The steroid is hydrogenated at 200–250 atmospheres hydrogen and 250° C. until approximately the required stoichiometric amount of hydrogen is absorbed (3 moles H$_2$/mole steroid). The catalyst is removed by filtration and the dioxane is distilled off to leave the 3,5-seco-cholestan-3,5-diol, which can be purified by recrystallization from a suitable solvent, e.g., ether-petroleum ether.

The reduction procedure of the present invention is generally applicable to steroids containing either a 3-keto-4-oxa-Δ⁵ grouping, or a 3,5-seco-5-keto-3-oic acid or ester grouping. Other carbon-to-carbon double bonds in the steroid will not interfere in the reaction as the lithium aluminum hydride will selectively reduce the above groupings containing carbon-to-carbon double bonds; with catalytic hydrogenation, carbon-to-carbon double bonds may be reduced, but this will not prevent the desired reduction to a 3,5-seco-3,5-diol. Hydroxyl substituents will not interfere in the reduction procedure. Other keto groups in the steroid enol lactones will be reduced by lithium aluminum hydride to hydroxyl groups, so that the corresponding hydroxy 3,5-seco-3,5-diols will be produced; however, if desired such keto groups can be protected during the reduction, e.g., by ketalization, and can be regenerated after the reduction. Acyloxy groups will be reduced to hydroxyl groups, but they can readily be regenerated by ordinary esterification procedures. Halogen substituents can be present in the steroid nucleus or in side chains, and will not ordinarily interfere in the reduction.

Steroids in which any unsaturation, aside from the enol lactone or keto acid groupings, is of the carbon-to-carbon double bond type are generally suitable for preparing 3,5-seco-3,5-dihydroxy steroids in which the double bonds or substituents correspond to those of the starting steroid. Steroids in which the structure is hydrocarbon, except for the 3,4,5(6)-positions, present even less chance for side reactions or modifications during the reduction procedure. Steroids which are saturated hydrocarbon except for the aforementioned positions are even more inert to side reactions.

Among the steroids which can be used in my procedure are 3-keto-4-oxa-Δ⁵-pregnene, 3,20-diketo-4-oxa-Δ⁵-pregnene, 3-keto-4-oxa-Δ⁵-cholestene, 3-keto-4oxa-Δ⁵,⁷-ergostadiene, 3-keto-4-oxa-Δ⁵-stigmastene, 3-keto-4-oxa-Δ⁵-testene, 3,11,20-triketo-4-oxa-Δ⁵-pregnene, 3-keto-4-oxa-Δ¹,⁵-pregnane, 3-keto-4-oxa-Δ⁵-pregnen-11-ol, 3-keto-4-oxa-Δ⁵-pregnen-11,20-diol, 3-keto-4-oxa-Δ⁵-pregnen-11,20-dione, 3-keto-4-oxa-Δ⁵-pregnen-11,17α,21-triol-20-one, 3-keto-4-oxa-Δ⁵-testen-17-one, 3 - keto-4-oxa-Δ⁵-cholestene-11, ol, etc.; in any of the above compounds, the 3-keto-4-oxa-Δ⁵-grouping can be replaced by a 3,5-seco-5-keto-4-nor-3-oic acid or ester grouping. As a 3,5-seco-5-keto-4-nor-3-oic ester steroid, any alkyl or aromatic ester derivatives are suitable, particularly those lower esters in which the esterifying group has 1 to 8 carbon atoms, e.g., methyl, ethyl, propyl, isopropyl, butyl, isobutyl, tert-butyl, hexyl, octyl, phenyl, benzyl, tolyl, etc.

For the reduction procedure, it is preferred to use lithium aluminum hydride as the reducing agent, although other metal hydrides, e.g., lithium borohydride, or any other reducing agent capable of reducing ester groups to alcohols can be used. For example, sodium in alcohol, or hydrogen over copper chromite are effective. Hydrogenation over Raney nickel can also be used, but this procedure is less desirable because of the more drastic conditions which are required, and the greater possibilities for side reactions.

The conditions for reduction procedures are well known to the art. For example, reduction with lithium aluminum hydrides involves merely reacting a stoichiometric quantity or a slight excess of lithium aluminum hydride with the steroid in ether solution for several hours, at room temperature to reflux temperature, decomposing the resulting complex and excess lithium aluminum hydride with ethyl acetate, water, or acid, and isolating the product. Larger or smaller amounts of lithium aluminum hydride can be used, although they are not ordinarily desirable.

A new group of steroid compounds, 3,5-seco-3,5-dihydroxy steroids, has been described. These new steroids are useful organic intermediates, particularly in the preparation of A-nor steroids and 4-hetero steroids. A method of preparing 3,5-seco-3,5-dihydroxy steroids through reduction of 5-keto-4-oxa-3-oic steroids or 3-keto-4-oxa-Δ⁵ steroids has been described, the reduction being effected by any procedure capable of reducing esters to alcohols.

I claim:

1. The compounds represented by the structure

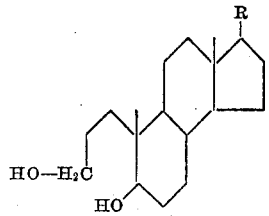

in which R is selected from the group consisting of hydrogen, CH$_3$CO—, —CH(CH$_3$)(CH$_2$)$_3$CH(CH$_3$)$_2$, —CH(CH$_3$)CH$_2$CH$_2$CH(C$_2$H$_5$)CH(CH$_3$)$_2$ —CH(CH$_3$)CH=CH(CH$_3$)CH(CH$_3$)$_2$, HOCH$_2$CO—, and CH$_3$CH(OH)—.

2. As a new compound, 3,5-seco-cholestan-3,5-diol.

3. As a new compound, 3,5-seco-pregnane-3,5-diol-20-one.

4. As a new compound, 3,5-seco-androstane-3,5-diol-17-one.

5. As a new compound, 3,5-seco-androstane-3,5-diol.

6. As a new compound, 4-oxa-pregnane-11,17α,21-triol-20-one.

7. A process for the preparation of 3,5-seco-3,5-dihydroxy steroids which comprises reducing a 3,5-seco-5-keto-3-oic steroid which is hydrocarbon except for the foregoing designated groups with a metal hydride reducing agent to obtain the 3,5-seco-3,5-dihydroxy steroid.

8. The process of claim 7 in which the metal hydride is lithium borohydride.

9. A process for the preparation of 3,5-seco-3,5-dihydroxy steroids which comprises reducing a 3,5-seco-5-keto-3-oic steroid which is hydrocarbon except for the foregoing designated groups with lithium aluminum hydride to obtain the 3,5-seco-3,5-dihydroxy steroid.

10. The process of claim 9 in which the 3,5-seco-5-keto-3-oic steroid compound is dehydrated to a 3-keto-4-oxa-Δ⁵ steroid prior to reduction to a 3,5-seco-3,5-dihydroxy steroid.

11. A process of preparing 3,5-seco-3,5-dihydroxy steroids which comprises reducing a 3,5-seco-5-keto-3-oic steroid which is hydrocarbon except for the foregoing groups by Bouveault-Blanch reduction with sodium and alcohol to obtain a 3,5-seco-3,5-dihydroxy steroid.

12. A process of preparing 3,5-seco-3,5-dihydroxy steroids which comprises reducing a steroid selected from the group consisting of Δ$^5$-4-oxa-cholesten-3-one, 3,5-seco-cholestan-3-one-5-oic acid and Δ$^5$-4-oxa-pregnen-3,20-dione ethylene ketal with lithium aluminum hydride.

13. A process which comprises reducing a 3,5-seco-5-keto-3-oic acid steroid which is saturated hydrocarbon except for the foregoing designated groups with lithium aluminum hydride to obtain a 3,5-seco-3,5-dihydroxy steroid.

14. A process of preparing 3,5-seco-3,5-dihydroxy steroids which comprises reducing a 3-keto-4-oxa-Δ$^5$ steroid which is hydrocarbon except for the foregoing designated grouping with lithium aluminum hydride to obtain the 3,5-seco-3,5-dihydroxy steroid.

References Cited in the file of this patent
UNITED STATES PATENTS 2,037,876  Bousquet _____ Apr. 21, 1936

OTHER REFERENCES

Fieser et al.: "Natural Products Related to Phenanthrene" (3rd. ed., 1949), p. 479, publ. by Reinhold Pub. Corp., New York.

Jacques et al.: Chem. Abstracts, vol. 45 (1951), col. 2495 (1 page).

Simonsen: "The Terpenes," vol. III (2nd ed., 1952), pp. 360–361, publ. by Cambridge University Press (London).

Rosenkrantz et al.: Helv. Chim. Acta, vol. 36 (1953), page 1001.

Fujimoto et al.: Jour. Amer. Chem. Soc., vol. 75 (1953), pp. 3259–61.

Smith et al.: Jour. Amer. Chem. Soc., vol. 76 (1954), pp. 6119–22.